United States Patent
Fodrini et al.

(10) Patent No.: US 12,245,113 B2
(45) Date of Patent: Mar. 4, 2025

(54) MOBILE DATA QUOTA MANAGING SYSTEM AND METHOD

(71) Applicant: Telecom Italia S.p.A., Milan (IT)

(72) Inventors: Maurizio Fodrini, Turin (IT); Damiano Rapone, Turin (IT)

(73) Assignee: Telecom Italia S.p.A., Milan (IT)

( * ) Notice: Subject to any disclaimer, the term of this patent is extended or adjusted under 35 U.S.C. 154(b) by 264 days.

(21) Appl. No.: 17/788,161

(22) PCT Filed: Dec. 16, 2020

(86) PCT No.: PCT/EP2020/086328
§ 371 (c)(1),
(2) Date: Jun. 22, 2022

(87) PCT Pub. No.: WO2021/130070
PCT Pub. Date: Jul. 1, 2021

(65) Prior Publication Data
US 2023/0011545 A1    Jan. 12, 2023

(30) Foreign Application Priority Data

Dec. 23, 2019 (IT) .................. 102019000025240

(51) Int. Cl.
*H04W 4/24* (2024.01)
*H04M 15/00* (2024.01)

(52) U.S. Cl.
CPC ......... *H04W 4/24* (2013.01); *H04M 15/7652* (2013.01); *H04M 15/854* (2013.01); *H04M 15/8214* (2013.01)

(58) Field of Classification Search
CPC ....... H04W 72/21; H04W 4/24; H04W 72/23; H04W 72/04; H04W 74/004;
(Continued)

(56) References Cited

U.S. PATENT DOCUMENTS 9,219,825 B2    12/2015  Sheikh Naziruddin et al.
9,325,597 B1 *   4/2016  Clasen .................... H04L 41/18
(Continued)

FOREIGN PATENT DOCUMENTS

EP    2391179 A1    11/2011
GB    2365699 A      2/2002
(Continued)

OTHER PUBLICATIONS

Feb. 23, 2021—(WO) International Search Report and Written Opinion—App PCT/EP2020/086328.

Primary Examiner — Olumide Ajibade Akonai
(74) Attorney, Agent, or Firm — Banner & Witcoff, Ltd.

(57) ABSTRACT

A system includes at least one mobile communication network for granting user equipment (UE) subscribed to the network a corresponding data quota comprising a corresponding amount of mobile data the UE can exchange with the network it is subscribed to. The system further includes a broker platform for making available for at least one mobile communication network a corresponding set of further data quotas, the broker platform further receiving a data amount request of a corresponding additional data quota for a UE subscribed to a corresponding network. In response to the received data amount request, the broker platform selects a further data quota from the set of further data quotas corresponding to the network the UE is subscribed to, and provides the additional data quota to the UE through the network the UE is subscribed to by exploiting at least a part of the selected further additional data quota.

16 Claims, 8 Drawing Sheets

(58) Field of Classification Search
CPC ... H04W 48/18; H04W 72/543; H04W 72/56; H04W 72/0453; H04W 72/20; H04W 4/60; H04W 28/22; H04W 28/20; H04W 28/24; H04W 72/044; H04W 28/26; H04W 72/00; H04M 15/8214; H04M 15/58; H04M 15/46; H04M 15/7652; H04M 15/885

See application file for complete search history.

(56) References Cited

U.S. PATENT DOCUMENTS

| | | | |
|---|---|---|---|
| 10,003,546 B1* | 6/2018 | Clasen | H04L 47/765 |
| 2015/0105045 A1 | 4/2015 | Rolfe et al. | |
| 2015/0139040 A1* | 5/2015 | Lee | H04M 15/59 |
| | | | 370/259 |
| 2015/0288827 A1 | 10/2015 | Bejerano et al. | |
| 2015/0358482 A1* | 12/2015 | Schouwenburg | H04M 15/8061 |
| | | | 455/406 |
| 2016/0323458 A1* | 11/2016 | Vadakkanmarveettil | H04M 15/885 |
| 2016/0352923 A1 | 12/2016 | Nah et al. | |
| 2018/0183940 A1* | 6/2018 | Kosseifi | H04M 15/885 |
| 2020/0169639 A1* | 5/2020 | Chai | H04M 15/77 |

FOREIGN PATENT DOCUMENTS

| | | |
|---|---|---|
| WO | 2016137752 A1 | 9/2016 |
| WO | 2019182572 A1 | 9/2019 |

* cited by examiner

MOBILE DATA QUOTA MANAGING SYSTEM AND METHOD

BACKGROUND OF THE INVENTION

Field of the Invention

The present invention relates to the field of the telecommunications. More specifically, the present invention relates to a method and a system for managing mobile data quotas.

Overview of the Related Art

Presently, people request on daily basis mobile data for availing of services (such as web browsing, audio/video streaming, video chat, and so on) using their User Equipment ("UEs"), such as smartphones or tablets.

Operators of mobile communication networks offer—in exchange for a subscription—mobile plans providing the subscribers with a corresponding amount (e.g., in terms of Gigabytes) of mobile data they can exploit using their UE for a prescribed period of time (e.g., every month). This (e.g., monthly) amount of mobile data is referred to as mobile data quota, or simply data quota.

With the widespread of services requiring an ever-increasing amount of mobile data, data quotas offered by network operators may be not sufficient or too expensive. For example, users which regularly avail of high definition video streaming services may entirely consume their available data quota before the expiration of the prescribed period of time (e.g., before the end of the month).

US 2016/0352923 discloses a method for providing, by a server, a sharing service that enables a plurality of user equipment to share at least one of digital assets. The method may include generating a sharing group for virtually linking a first user equipment with a second user equipment in response to a grouping request message from the first user equipment, creating a virtual data sharing storage in association with the generated sharing group in order to virtually store a predetermined amount of sharing data allowance, in response to a data depositing message from the first user equipment, depositing a first amount of data allowance into the virtual data sharing storage for sharing the first amount of data allowance belonging to the first user equipment with the second user equipment virtually linked to the first user equipment as the same sharing group, and in response to a data withdrawing message from the second user equipment, withdrawing a second amount of data allowance from the sharing data allowance stored in the virtual data sharing storage for using the second amount of the sharing data allowance by the second user equipment.

U.S. Pat. No. 9,219,825 discloses to share cellular data access capabilities between mobile devices. Users of the mobile devices can be presented with options for selecting a set of polices for sharing cellular data access capabilities between the mobile devices and as a function of cellular data plan capacities. The set of policies can be stored in a memory of the mobile devices. Using a first application operating on a first one of the mobile devices and based upon the stored set of polices, a request can be transmitted to request cellular data access capabilities of a second one of the mobile devices. Using a second application operating on the second mobile device and based upon the stored set of policies, the first mobile device can be provided access to cellular data access capabilities of a second mobile devices.

EP 2391179 discloses a system and method implemented at a communication device or mobile hotspot device for providing access to data services over a wireless communication network to one or more user devices. The communication or hotspot device is adapted to provide router, mobile hotspot-type or ad hoc networking functions to user devices such as laptops, tablets, and other entertainment and productivity devices adapted to communicate over a wireless LAN and to provide access to broadband data services. The data services provided over the network may be subject to one or more data allowances or data transfer limits. The communication or hotspot device is adapted to manage the user device connections and data transfer to and from the communication device within the data allowances or according to predetermined prioritization.

GB2365699 discloses a mobile telephone having a SIM card and control circuit including an interface for wirelessly communicating identification and/or authentication data from the SIM card over a short-range to the wireless interface of a second, SIM-less telephone, e.g. mobile telephone, thereby allowing the second telephone to access a radio communications network. The SIM-less telephone may be separately identified and/or authenticated by the donor mobile telephone, with data being transmitted over the short-range wireless connection only if the SIM-less telephone is authorised to receive the data. The donor telephone may cease to operate whilst the SIM-less telephone is connected to the network, with the donor telephone resuming operation when the SIM-less telephone disconnects, or when the short-range wireless connection is broken. The SIM-less telephone may be a motor vehicle radiotelephone.

SUMMARY OF THE INVENTION

The Applicant has found that the known solutions cited above for managing and improving data quota offered by mobile communication networks are not efficient because affected by several drawbacks.

The solution disclosed in US 2016/0352923 requires the creation of static group of users that has to explicitly interact to each other and is not able to efficiently fulfill privacy and security requirements.

The solution disclosed in U.S. Pat. No. 9,219,825 is not capable of differentiating data packets associated to each mobile device accessing network services and it works only for mobile devices that are in a geographical proximity.

EP 2391179 provides for a specific platform, not integrated into the mobile communication networks, that is not able to efficiently control data transfer between users and the mobile communication networks.

The solution disclosed in GB2365699 is not capable of allowing a plurality of different mobile devices to interact with the mobile communication networks in an independent manner.

In view of the above, the Applicant has devised a solution for a flexible and efficient management of data quotas for data communication between UE and mobile communication networks.

An aspect of the present invention relates to a system.

According to an embodiment of the present invention, the system comprises at least one mobile communication network each one adapted to grant UE subscribed thereto a corresponding data quota comprising a corresponding amount of mobile data the UE is allowed to exchange with the mobile communication network it is subscribed to.

According to an embodiment of the present invention, the system further comprises a broker platform configured to make available for at least one mobile communication network a corresponding set of further data quotas.

According to an embodiment of the present invention, the broker platform is further configured to receive a data amount request of a corresponding additional data quota for a UE subscribed to a corresponding mobile communication network, and, in response to the received data amount request, select a further data quota from the set of further data quotas corresponding to the mobile communication network the UE is subscribed to.

According to an embodiment of the present invention, the broker platform is configured to provide the additional data quota to the UE through the mobile communication network the UE is subscribed to by exploiting at least a part of the selected further additional data quota.

According to an embodiment of the present invention, the further data quotas comprise network additional data quotas made available on the broker platform in response to a data quota agreement established between the at least one mobile communication network and at least one between the broker platform and service provider.

According to an embodiment of the present invention, the further data quotas comprise at least one shared data quota taken from the data quota of a corresponding UE subscribed to the communication network corresponding to the further data quotas.

According to an embodiment of the present invention, the at least one shared data quota is made available on the broker platform in response to a data sharing agreement between the broker platform and the corresponding UE.

According to an embodiment of the present invention, the broker platform is configured to, in response to a received data amount request of an additional data quota for a UE subscribed to a corresponding mobile communication network, interact with a Session Management Function of the mobile communication network for opening a Packet Forwarding Control Protocol session toward an User Plane Function instance corresponding to the selected further data quota, and provide a corresponding data threshold for the additional data quota.

According to an embodiment of the present invention, the Session Management Function of the mobile communication network is configured to open the Packet Forwarding Control Protocol session and establish a packet of rules comprising an indication of a run-time data usage of the additional data quota for the UE.

According to an embodiment of the present invention, the Session Management Function of the mobile communication network is further configured to instantiate an Uplink Classifier functionality within the User Plane Function instance for identifying and discriminating data packet transmitted to/received from UE using the additional data quota.

According to an embodiment of the present invention, the Session Management Function of the mobile communication network is further configured to periodically forward to the broker platform the run-time data usages of additional data quotas for UE that are using the selected further data quota.

According to an embodiment of the present invention, the broker platform is configured to monitor the residual availability of data of an additional data quota for a UE by making a comparison between the actual run-time data usage of the UE and the data threshold for the additional data quota.

According to an embodiment of the present invention, the broker platform is configured to notify a UE about the inability of benefiting anymore from the data of the corresponding additional data quota when the actual run-time data usage of the UE equals the data threshold for the additional data quota.

According to an embodiment of the present invention, the broker platform is configured to generate a notification about a reduction of available data in the selected further data quota when the actual run-time data usage of the UE equals the data threshold for the additional data quota.

According to an embodiment of the present invention, the broker platform is configured to add up the run-time data usages of additional data quotas for UE that are using a same further data quota for calculating an overall data usage of the further data quota, and sending the calculated overall data usage of the further data quota to a Policy and Charging Function of the mobile communication network corresponding to the further data quota.

According to an embodiment of the present invention, the broker platform is configured to generate a notification about the expiration of a further data quota when the calculated overall data usage of the further data quota reaches a corresponding overall amount of data of the further data quota.

Another aspect of the present invention relates to a method.

According to an embodiment of the present invention, the method comprises having at least one mobile communication network grant UE subscribed thereto a corresponding data quota comprising a corresponding amount of mobile data the UE is allowed to exchange with the mobile communication network it is subscribed to.

According to an embodiment of the present invention, the method further comprises having a broker platform make available for at least one mobile communication network a corresponding set of further data quotas.

According to an embodiment of the present invention, the method further comprises having the broker platform receive a data amount request of a corresponding additional data quota for a UE subscribed to a corresponding mobile communication network.

According to an embodiment of the present invention, the method further comprises having the broker platform, in response to the received data amount request, select a further data quota from the set of further data quotas corresponding to the mobile communication network the UE is subscribed to.

According to an embodiment of the present invention, the method further comprises having the broker platform provide the additional data quota to the UE through the mobile communication network the UE is subscribed to by exploiting at least a part of the selected further data quota.

BRIEF DESCRIPTION OF THE DRAWINGS

These and other features and advantages of the solution according to the present invention will be better understood by reading the following detailed description of an embodiment thereof, provided merely by way of non-limitative example, to be read in conjunction with the attached drawings. On this regard, it is explicitly intended that the drawings are not necessarily drawn to scale (with some details thereof that can be exaggerated and/or simplified) and that, unless otherwise stated, they are simply used for conceptually illustrating the described structures and procedures. Particularly.

DETAILED DESCRIPTION

Figure 1A:
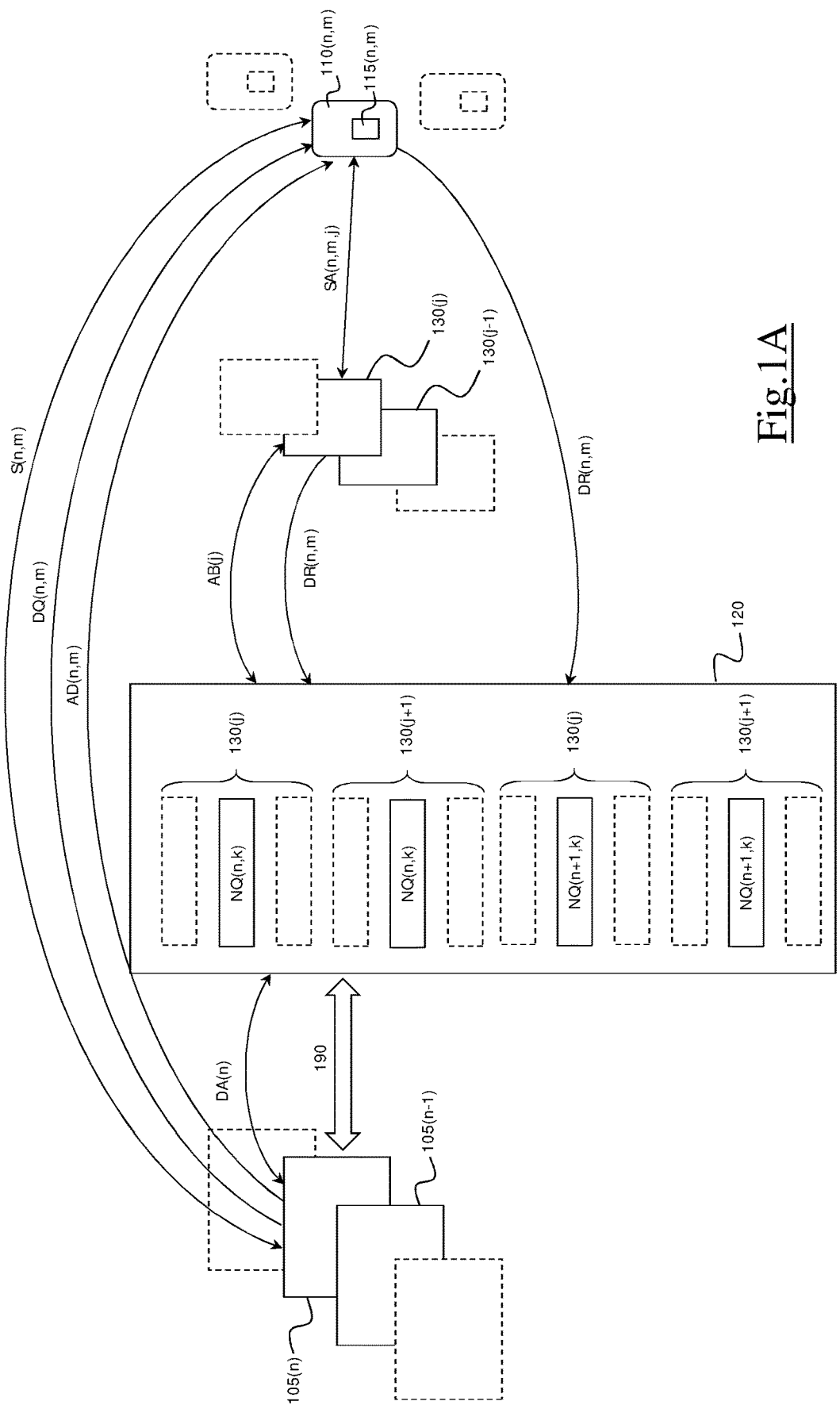
FIGS. 1A-1D illustrate, in terms of functional modules, scenarios in which a method and a system for managing mobile data quotas can be applied according to embodiments of the present invention.

FIG. 1A illustrates in terms of functional modules a scenario in which a method and a system for managing mobile data quotas can be applied according to an embodiment of the present invention.

It should be noted that the terms 'unit', 'system', 'platform' or 'module' are herein intended to comprise, but not limited to, hardware, firmware, software, and combinations thereof.

For example, a unit, system, platform, or module may be, but is not limited to being, a process running on a processor, a processor, an object, an executable, a thread of execution, a program, and/or a computing device.

In other words, a unit, system, platform or module may comprise an application being executed on a computing device and/or the computing device itself.

One or more units, systems, platforms or modules may be localized on one computing device and/or distributed between two or more computing devices.

Units, systems, platforms or modules may comprise and/or interact with computer readable media storing data according to various data structures.

The units, systems, platforms or modules may communicate by exploiting local and/or remote processes, preferably by means of electrical, electromagnetic and/or optical signals providing one or more data packets, such as data packets from one unit, system, platform or module interacting with another unit, system or module in a local system, in a distributed system, and/or across a radio network and/or a wired network.

In this scenario, one or more mobile communication networks $105(n)$ (n=1, 2, . . . ) are configured to wirelessly exchange data with corresponding UE, such as smartphones or tablets. For example, the mobile communication networks $105(n)$ may be 5G mobile communication networks.

In order to be allowed of exchanging data with a generic n-th mobile communication network $105(n)$, the user of a UE has to make (usually, buy) a corresponding subscription S(n,m) to the operator of the n-th mobile communication network $105(n)$. The generic m-th UE whose user made a subscription S(n,m) to the operator of the generic n-th mobile communication network $105(n)$ (briefly, "UE associated to the mobile communication network $105(n)$") is hereinafter identified with reference $110(n,m)$.

The UE $110(n,m)$ associated to the mobile communication network $105(n)$ is equipped with a corresponding Subscriber Identity Module (SIM) $115(n,m)$ configured to securely store an International Mobile Subscriber Identity (IMSI) and related keys adapted to identify and authenticate the user of the UE $110(n,m)$ having made the subscription S(n,m). The concepts of the present invention can be also applied to the case in which the UE $110(n,m)$ may be equipped with multiple SIMs, or a virtual SIM, or also when the UE $110(n,m)$ is configured to perform a SIMless authentication.

Through the subscription S(n,m), the operator of the mobile communication network $105(n)$ grants the user of the UE $110(n,m)$ a corresponding (mobile) data quota DQ(n,m), i.e., a corresponding amount of mobile data (e.g., in terms of Gigabytes) the UE $110(n,m)$ equipping the SIM $115(n,m)$ is allowed to exchange with the mobile communication network $105(n)$, for example to be used during a prescribed period of time (e.g., every month).

According to an embodiment of the present invention, a data quota brokering management platform 120 is provided (hereinafter, simply "broker platform"), the owner of which (hereinafter, also referred to as "broker") made a data quota agreement DA(n) with one or more of the (operators of the) mobile communication networks $105(n)$ in order to purchase therefrom corresponding sets of additional data quotas. For each mobile communication network $105(n)$, or for a subset thereof, a corresponding set K(n) of network additional data quotas NQ(n, k) (k=1, 2, . . . ) is purchased and made available on the broker platform 120. Each network additional data quota NQ(n, k) provides a respective overall amount of data TH(n,k). As will be described in detail in the following of the description, portions of the network additional data quotas NQ(n, k) available on the broker platform 120 which correspond to a mobile communication network $105(n)$ can be provided to UE $110(n,m)$ associated to the mobile communication network $105(n)$ in order to increase the amount of mobile data traffic the UE $110(n,m)$ can exchange with the mobile communication network $105(n)$.

One or more service providers $130(j)$ (j=1, 2, . . . ) are configured to provide services (e.g., video and/or audio streaming) to UE $110(n,m)$ whose users made a service agreement SA(n,m,j) therewith. It has to be appreciated that a same service provider $130(j)$ is in general configured to provide services to UE $110(n,m)$ associated to different mobile communication networks $105(n)$.

According to an embodiment of the present invention, at least one service provider $130(j)$ establishes a brokering agreement AB(j) with the broker of the broker platform 120 in order to purchase some of the available network additional data quotas NQ(n, k) corresponding to one or more mobile communication networks $105(n)$.

According to an embodiment of the present invention, the service provider $130(j)$ may offer to UE $110(n,m)$, whose users made a service agreement SA(n,m,j) with the service provider $130(j)$ itself, an additional data quota AD(n,m) taken from a selected network additional data quota NQ(n,k) corresponding to the mobile communication network $105(n)$, to be used in place of or in addition to its data quota DQ(n,m). The additional data quota AD(n,m) may be offered by the service provider $130(j)$ to the UE $110(n,m)$ as a Value-Added Service (VAS) for enjoying specific services provided by the service provider $130(j)$ (e.g., to be used for video and/or audio streaming), or for other purposes not relating to the services provided by the service provider $130(j)$ (e.g., to be used when the data quota DQ(n,m) is exceeded).

According to an embodiment of the present invention, in order to exploit the offered additional data quota AD(n,m), the UE $110(n,m)$ forwards a registration and data amount request to the broker platform 120, specifying the amount of data (data threshold) th(n,m) of the offered additional data quota AD(n,m) and the intended way of utilization of the offered additional data quota AD(n,m) (for example, for enjoying specific services provided by the service provider 130(*j*)). According to another embodiment of the present invention, the registration and data amount request to the broker platform 120 is instead directly carried out by the service provider 130(*j*) in the place of the UE 110(*n,m*). According to an embodiment of the present invention, the registration and data amount request can be sent using a communication mechanism including for example a web interface or a dedicated app.

According to an embodiment of the present invention, in response to the received registration and data amount request, the broker platform 120 is configured to select a corresponding network additional data quota NQ(n,k)— reserved for the service provider 130(*j*)—available on the broker platform 120 and corresponding to the mobile communication network 105(*n*) the requesting UE 110(*n,m*) is associated to.

In this way, the mobile communication network 105(*n*) may serve the UE 110(*n,m*) using the amount of data of the additional data quota AD(n,m) taken from the selected network additional data quota NQ(n,k) instead of using data taken from its own data quota DQ(n,m).

The bidirectional arrow identified with reference 190 between the mobile communication networks 105(*n*) and the broker platform 120 represents the interactions between the mobile communication networks 105(*n*) and the broker platform 120 for the management of additional data quotas AD(n,m) which will be described in greater detail with reference to FIG. 4.

Figure 1B:
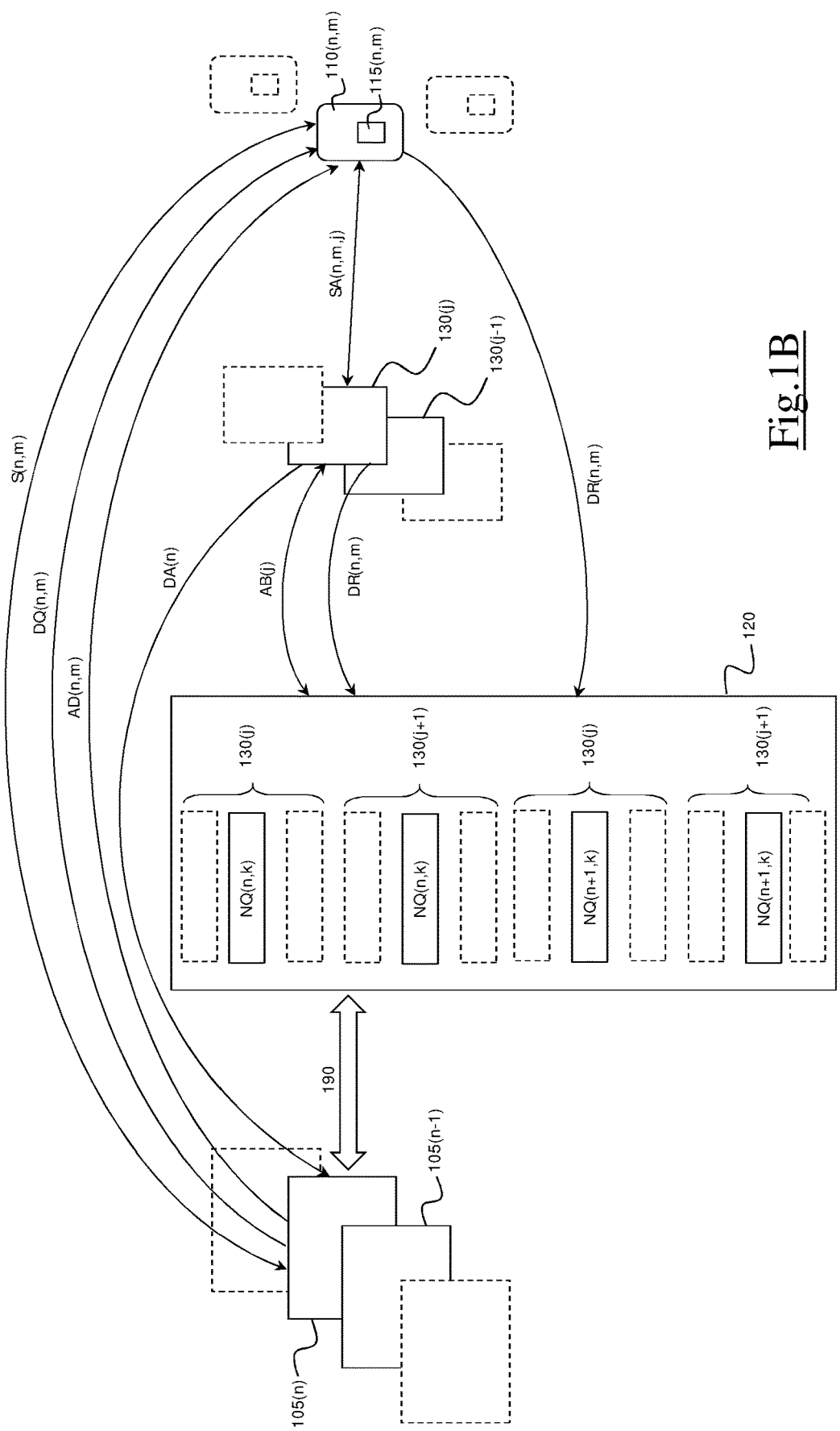

FIG. 1B illustrates in terms of functional modules a scenario in which a method and a system for managing mobile data quotas can be applied according to a further embodiment of the present invention.

The scenario illustrated in FIG. 1B differs from the one illustrated in FIG. 1A in that:
- the network additional data quotas NQ(n, k) are directly purchased by the service provider 130(*j*) (instead of by the broker which owns the broker platform 120) through a data quota agreement DA(n) with one or more of the (operators of the) mobile communication networks 105(*n*);
- the service provider 130(*j*) having purchased the network additional data quotas NQ(n, k) establishes a brokering agreement AB(j) with the broker of the broker platform 120 in order to make the purchased network additional data quotas NQ(n, k) available on the broker platform 120.

Apart from the two difference above, the scenarios illustrated in FIGS. 1A and 1B are the same.

Figure 1C:
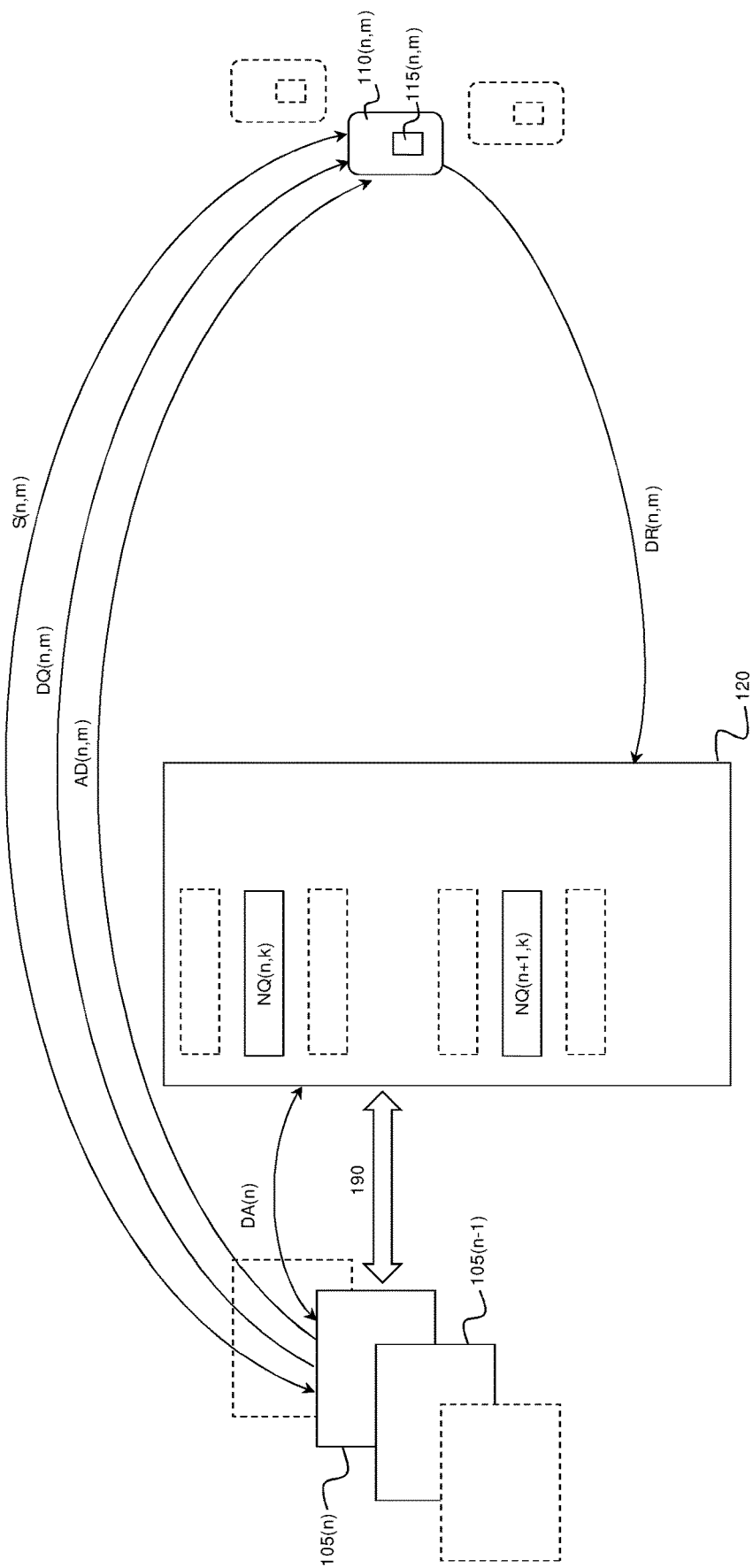

FIG. 1C illustrates in terms of functional modules a scenario in which a method and a system for managing mobile data quotas can be applied according to a further embodiment of the present invention.

In the scenario illustrated in FIG. 1C, there is no service provider 130(*j*), and the network additional data quotas NQ(n, k) purchased by the broker and provided over the broker platform 120 can be exploited for allowing a user of a UE 110(*n,m*) to directly request an additional data quota AD(n,m) (corresponding to an amount of data (data threshold) th(n,m)) of the network additional data quotas NQ(n, k) through a registration and data amount request to the broker platform 120.

It has to be appreciated that in all the scenarios illustrated in FIGS. 1A-1C, the network additional data quotas NQ(n, k) may be also obtained (purchased) from a Mobile Virtual Network Operator (MVNO) whose services rely on modules of an operator's mobile communication network.

Figure 1D:
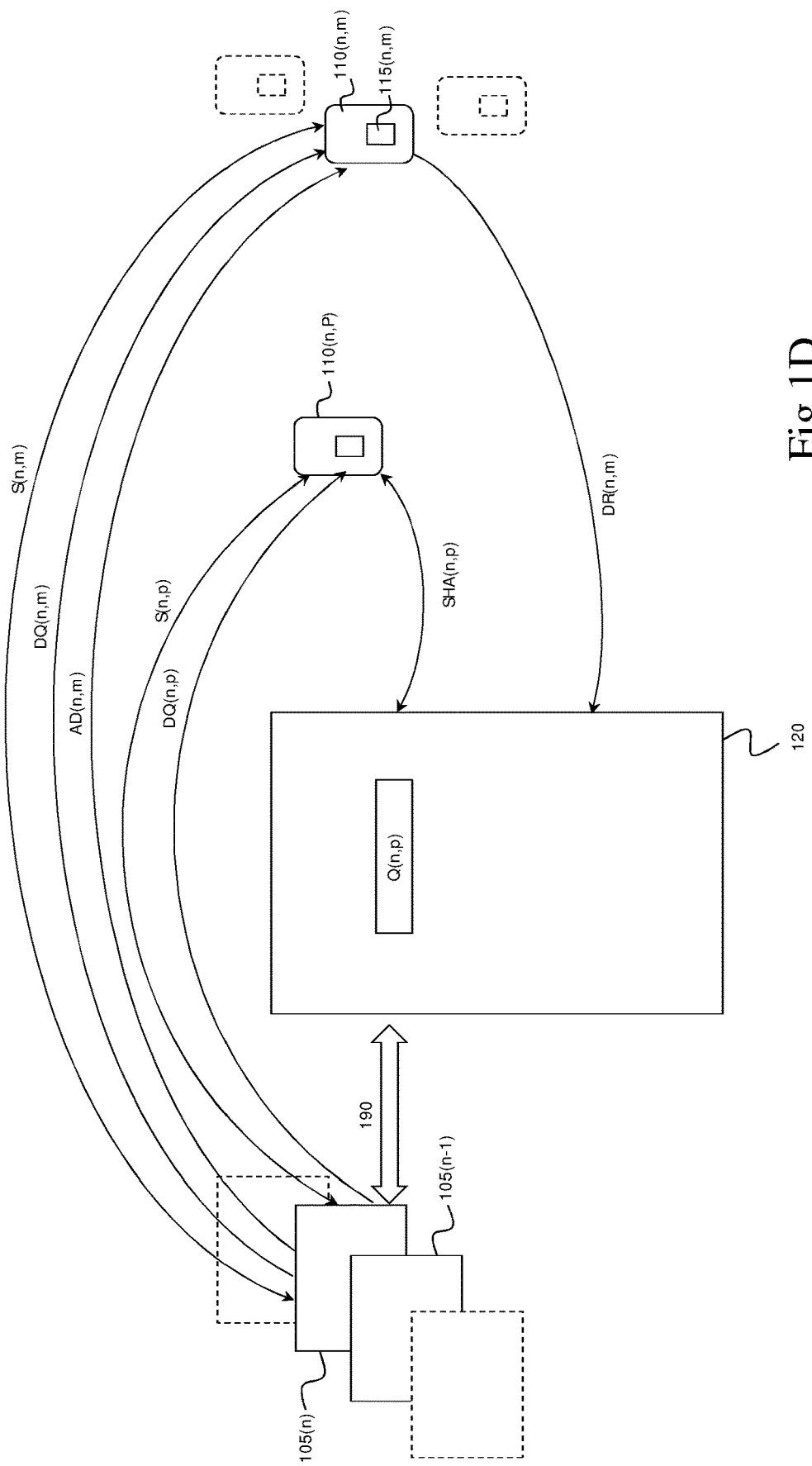

FIG. 1D illustrates in terms of functional modules a scenario in which a method and a system for managing mobile data quotas can be applied according to a further embodiment of the present invention.

In the scenarios described above with reference to FIGS. 1A-1C, the additional data quota AD(n,m) offered to the UE 110(*n,m*) are parts of network additional data quotas NQ(n, k) purchased from (the operator of) the mobile communication networks 105(*n*) by the (broker of the) broker platform 120 or by a service provider 130(*j*). Instead, in the scenario of FIG. 1D, a (user of a) UE 110(*n,p*) having made a subscription S(n,p) to the operator of a mobile communication network 105(*n*) for receiving a corresponding (mobile) data quota DQ(n,p), establishes a sharing agreement SHA(n,p) with the broker platform 120 in order to make a shared data quota Q(n,p), taken from its own data quota DQ(n,p), available on the broker platform 120. The shared data quota Q(n,p), or portions thereof, can then be offered as additional data quota(s) AD(n,m) to others UE 110(*n,m*) associated to the same mobile communication network 105(*n*) of the UE 110(*n,p*).

It has to be appreciated that according to an embodiment of the present invention, in the scenario illustrated in FIGS. 1D, the shared data quotas Q(n, p) may also be part of the data quota DQ(n,p) of UE 110(*n,p*) obtained (purchased) from a Mobile Virtual Network Operator (MVNO) whose services rely on modules of an operator's mobile communication network.

According to another embodiment of the present invention, the broker platform 120 in any of the scenarios of FIGS. 1A-1D may be also owned by one of the mobile communication networks 105(*n*).

Thanks to the solutions according to the embodiments of the present invention, each UE 110(*n,m*) in any of the scenarios of FIGS. 1A-1D can be advantageously identified by the mobile communication network 105(*n*) when it uses data from the offered additional data quotas AD(n,m) (e.g. for lawful interception purposes).

Moreover, in any of the scenarios of FIGS. 1A-1D, the UE 110(*n,m*) is not able to know the origin of the data exploited from the additional data quota AD(n,m), since the data management is carried out by the broker platform 120.

Figure 2:
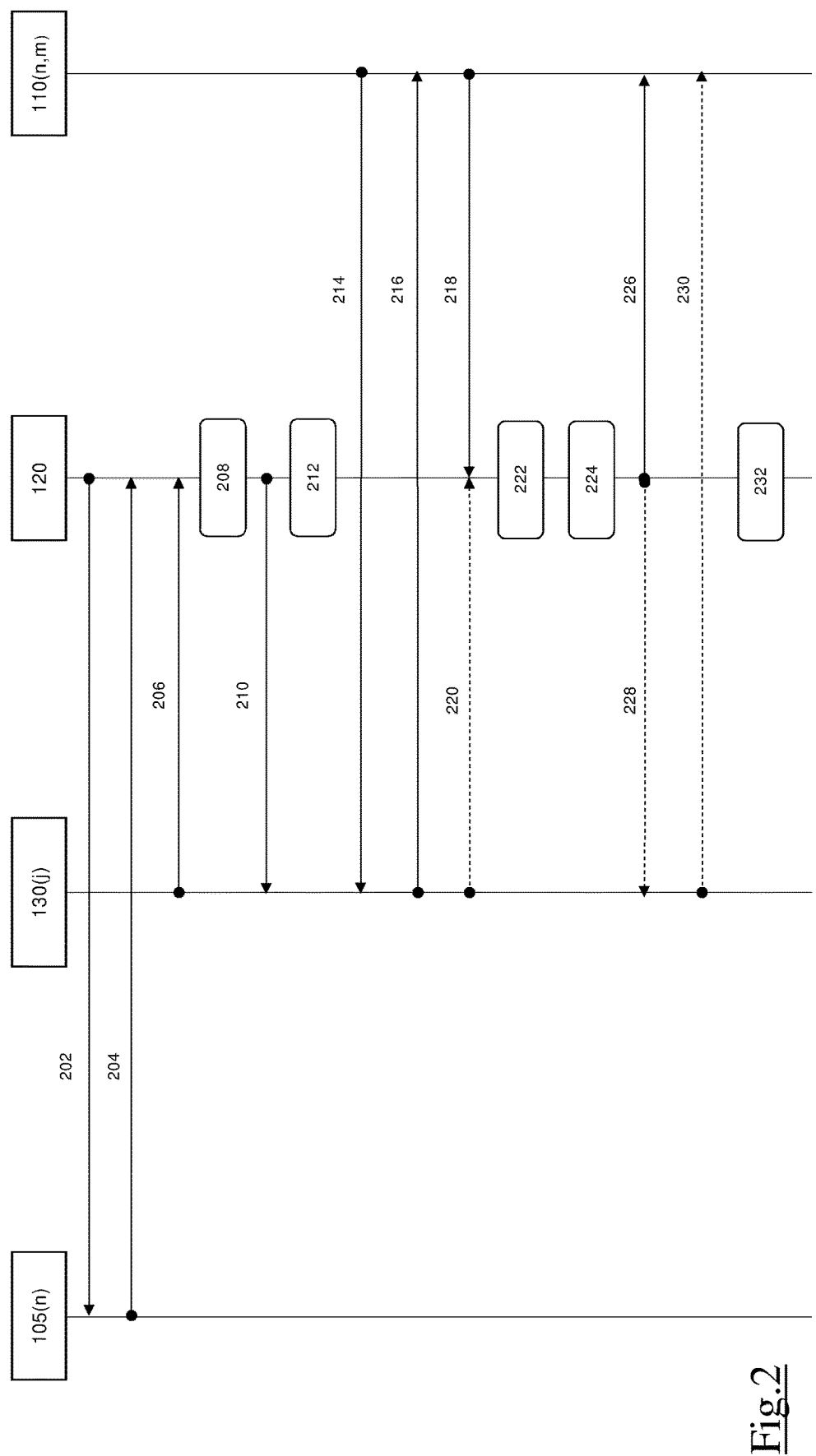
FIG. 2 schematically illustrates a set of operation phases carried out by a mobile communication network, a service provider, a broker platform and a UE in the scenario of FIG. 1A according to an embodiment of the present invention.

FIG. 2 schematically illustrates a set of operation phases carried out by a mobile communication network 105(*n*), a service provider 130(*j*), the broker platform 120 and a UE 110(*n,m*) associated to the mobile communication network 105(*n*) in the scenario of FIG. 1A according to an embodiment of the present invention.

The first phase according to an embodiment of the present invention provides for the establishment of a data quota agreement DA(n) between the broker platform 120 and the (operator of the) mobile communication network 105(*n*) in order to purchase therefrom a corresponding set of network additional data quotas NQ(n,k). For this purpose, the broker platform 120 sends an agreement and data quota request to the mobile communication network 105(*n*) (operation 202), and the mobile communication network 105(*n*) affirmatively answers to the request by sending back to the broker platform 120 an acceptance notification (operation 204). In this way, the set of network additional data quotas NQ(n,k) is made available on the broker platform 120.

The next phase according to an embodiment of the present invention provides for the establishing of a broker agreement AB(j) between the service provider 130(j) and the broker platform 120 in order to cause the service provider 130(j) making use of (e.g., purchase) some of the available network additional data quotas NQ(n, k) corresponding to the mobile communication networks 105(n). For this purpose, the service provider 130(j) sends a broker agreement request to the broker platform (operation 206). The broker platform 120 verifies the service provider 130(j) reputation and reliability and checks whether the broker agreement request is actually feasible from a system capacity point of view, i.e., it verifies if there is a sufficient number of available additional data quotas NQ(n, k) (operation 208). In case the check gives a positive result, the broker platform 120 affirmatively answers to the broker agreement request by sending back to the service provider 130(j) an acceptance notification (operation 210).

At this point, according to an embodiment of the present invention, the additional data quotas NQ(n,k) made available on the broker platform 120 are reserved for the service provider 130(j) (operation 212) for being offered to UE 110(n,m) whose users made (or will make) a service agreement SA(n,m,j) with the service provider 130(j).

For this purpose, according to an embodiment of the present invention, when (the user of) a UE 110(n,m) forwards (operation 214) a service agreement SA(n,m,j) request to the service provider 130(j) (e.g., in the form of a first-time subscription, or a subscription to some additional services), the service provider 130(j) may forward in turn an offer of a corresponding additional data quota AD(n,m) to the UE 110(n,m) (operation 216). The offer may specify the way the additional data quota AD(n,m) may be used, for example for enjoying services provided by the service provider 130(j), or for other purposes not relating to the services provided by the service provider 130(j). The service provider 130(j) may also offer additional data quotas AD(n, m) as benefits for new customer acquisition purposes.

According to an embodiment of the present invention, the UE 110(n,m) then forwards a registration and data amount request to the broker platform 120 (operation 218), specifying the amount of data (data threshold) th(n,m) of the offered additional data quota AD(n,m), and preferably details about the intended way of utilization of the additional data quota AD(n,m), comprising for example the kind and/or number of specific services to be enjoyed, and/or the usage time thereof (for example agreed with the service provider 130(j)).

According to another embodiment of the present invention, the registration and data amount request is instead directly forwarded by the service provider 130(j) to the broker platform 120 in the place of the UE 110(n,m) (operation 220). In this case, the service provider 130(j) may be advantageously configured to forward to the broker platform 120 multiple registration and data amount requests pertaining to a plurality of different UE 110(n,m) at the same time. In this case as well, details about the intended way of utilization of the additional data quotas AD(n,m) may be provided.

According to an embodiment of the present invention, the broker platform 120 is configured to verify the reputation and/or reliability of the UE 110(n,m) corresponding to the received registration and data amount request (operation 222).

According to an embodiment of the present invention, once the reputation and/or reliability of the UE 110(n,m) has been positively verified, the broker platform 120 selects a corresponding network additional data quota NQ(n,k) available on the broker platform 120 and assigns a portion of the network additional data quota NQ(n,k) for the offered additional data quota AD(n,m) corresponding to an amount of data th(n,m) based on the received registration and data amount request (operation 224). The selected portion of network additional data quota NQ(n,k) is selected among the network additional data quota NQ(n,k) reserved (e.g., owned) by the service provider 130(j) and corresponding to the mobile communication network 105(n) the requesting UE 110(n,m) is associated to.

According to an embodiment of the present invention, once the selection of a network additional data quota NQ(n, k) fulfilling the requested additional data quota AD(n,m) is carried out, the broker platform 120 forwards a data amount request acceptance notification to the requesting UE 110(n, m). This notification can be directly forwarded to the requesting UE 110(n,m) by the broker platform 120 (operation 226) in case the registration and data amount request was directly carried out by the UE 110(n,m), or can be forwarded through the service provider 130(j) (operations 228 and 230) in case the registration and data amount request was carried out by the service provider 130(j).

At this point, the UE 110(n,m) is allowed to use the offered additional data quota AD(n,m) taken from the selected network additional data quota NQ(n,k) instead of using data taken from its own data quota DQ(n,m) (operation 232).

The operations described with reference to FIG. 2 can be also be applied to the scenario of FIG. 1B, with the following differences:

- the data quota agreement DA(n) is established between the service provider 130(j) and the mobile communication network 105(n), and therefore the operations 202 and 204 are carried out between these two entities;
- the operations 206-210 relating to the broker agreement AB(j) between the service provider 130(j) and the broker of the broker platform 120 relate to make the network additional data quotas NQ(n, k) purchased by the service provider 130(j) available on the broker platform 120.

The concepts of the present invention can also be applied to the case in which the network additional data quotas NQ(n, k) are directly purchased by the service provider 130(j) (like in the scenario illustrated in FIG. 1B), and at the same time the service provider 130(j) is also the owner of the broker platform 120. It has to be appreciated that in this case, a further service provider different from the one being the owner of the broker platform 120 (i.e., the service provider 130(j)) may establish data quota agreements DA(n) and/or broker agreements AB(j) in the same way described with reference to both the two scenarios of FIGS. 1A and 1B.

In order to be applied also to the scenario of FIG. 1C, the operations described with reference to FIG. 2 should be modified in the following way.

- the operations 206-210 relating to broker agreement AB(j) involving the service provider 130(j) are no more required;
- the operation 212 in which the additional data quotas NQ(n, k) made available on the broker platform 120 are reserved for the service provider 130(j) for being offered to UE 110(n,m) whose user made a service agreement SA(n,m,j) with the service provider 130(j) is no more affected by the outcome of a broker agreement AB(j) with the service provider 130(j), since the service provider 130(j) is not present;

the operations 214-220 directed to the request from the UE 110(n,m) to use an offered additional data quota AD(n,m) are simplified, since they simply require that the (user of the) UE 110(n,m) forwards a registration and data amount request to the broker platform 120, specifying the corresponding amount of data (data threshold) th(n,m) of the additional data quota AD(n, m), and preferably details about the intended way of utilization of the additional data quota AD(n,m) (therefore, operations 214 and 216 are not carried out);

the operation 222 for verifying the reputation and/or reliability of the UE 110(n,m) that made the request is modified in order to further include also a verification about the feasibility of the data amount requested by the UE 110(n,m), since in the scenario of FIG. 1C no previous broker agreement AB(j) has been made, and therefore the broker platform 120 is not able to know a priori the availability of data among the additional data quotas NQ(n,k).

Figure 3:
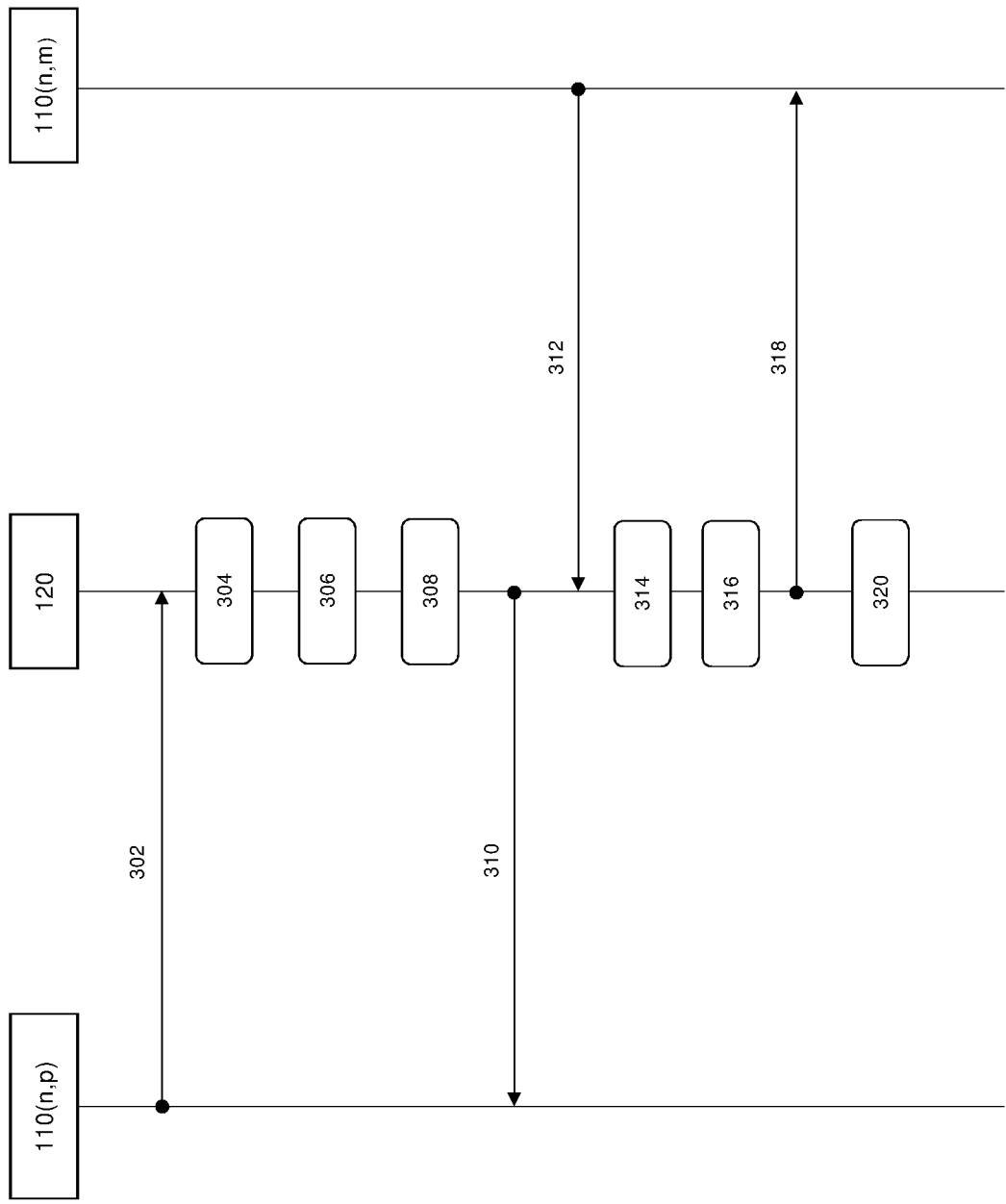
FIG. 3 schematically illustrates a set of operation phases carried out by the broker platform, a UE and another UE associated to a same mobile communication network in the scenario of FIG. 1D according to an embodiment of the present invention.

FIG. 3 schematically illustrates a set of operation phases carried out by the broker platform 120, the UE 110(n,p) and a UE 110(n,m) associated to the same mobile communication network 105(n) of the UE 110(n,p) in the scenario of FIG. 1D according to an embodiment of the present invention.

The first phase according to an embodiment of the present invention provides for the establishment of a sharing agreement SHA(n,p) between the UE 110(n,p) and the broker platform 120. For this purpose, the UE 110(n,p) sends a registration and sharing agreement request to the broker platform 120 specifying the intention to make (portions of) its data quota DQ(n,p) available on the broker platform 120 for being shared among other UE 110(n,m) associated with the same mobile communication network 105(n) of the UE 110(n,p) and registered to the broker platform 120 (operation 302). According to an embodiment of the present invention, the request can be sent using a communication mechanism including for example a web interface or a dedicated app. According to an embodiment of the present invention, the UE 110(n,p) also specifies the overall amount of data TH(n,p) associated to the shared data quota Q(n, p)—taken from its own data quota DQ(n,p)—the UE 110 (n,p) requested to make available on the broker platform 120. Additionally, the UE 110(n,p) request may also comprise an indication about possible allowed modes for accessing and using such shared data quota Q(n,p), e.g., by filling a proper form made available by the broker platform 120. For example, the UE 110(n,p) request may specify of usage time, data bundle of interest, service topology and/or indication of specific events.

According to an embodiment of the present invention, the broker platform 120 then verifies the reputation and reliability of the UE 110(n,p) (operation 304), and, if the verification gives a positive result, the broker platform 120 elects the user of the UE 110(n,p) as a "super-user", granting the possibility of making the shared data quota Q(n,p) available on the broker platform 120 (operation 306).

At this point, according to an embodiment of the present invention, the shared data quota Q(n,p) is made available on the broker platform 120 (operation 308), and the UE 110(n, p) is accordingly notified (operation 310).

According to an embodiment of the present invention, the broker platform 120 can also allow the super-user of the UE 110(n,p) to make available to other UE 110(n,m) a reference contact tool (e.g., email, SMS, app notifications, web page) allowing them to make specific requests about how the shared data quota Q(n,p) can be accessed and used, that can be accordingly forwarded by the super-user of the UE 110(n,p) to the broker platform 120.

According to an embodiment of the present invention, the (user of the) UE 110(n,m) forwards to the broker platform 120 a registration and data amount request of an additional data quota AD(n,m) to be taken from the shared data quota Q(n,p), specifying the corresponding amount of data th(n,m) of the additional data quota AD(n,m), and preferably details about the intended way of utilization of the additional data quota AD(n,m) (operation 312)

According to an embodiment of the present invention, the broker platform 120 verifies the reputation and/or reliability of the UE 110(n,m) that made the request as well as verifies the feasibility of the data amount requested by the UE 110(n,m) (operation 314).

According to an embodiment of the present invention, the broker platform 120 selects the most suitable shared data quota Q(n,p) available on the broker platform 120 and assigns (a portion of) the shared data quota Q(n,p) for the additional data quota AD(n,m) corresponding to an amount of data th(n,m) based on the received registration and data amount request (operation 316).

At this point, according to an embodiment of the present invention, the broker platform 120 forwards a data amount request acceptance notification to the requesting UE 110(n, m) (operation 318).

At this point, the UE 110(n,m) is allowed to use the additional data quota AD(n,m) taken from the shared data quota Q(n,p) instead of (or in addition to) using data taken from its own data quota DQ(n,m) (operation 320).

According to an embodiment of the present invention, the UE 110(n,m) and the UE 110(n,p) may communicate to each other through the broker platform 120 for allowing variations in the additional data quota AD(n,m) and/or in the data amount request (e.g., for changing the way such additional data quota AD(n,m) can be exploited).

Figure 4:
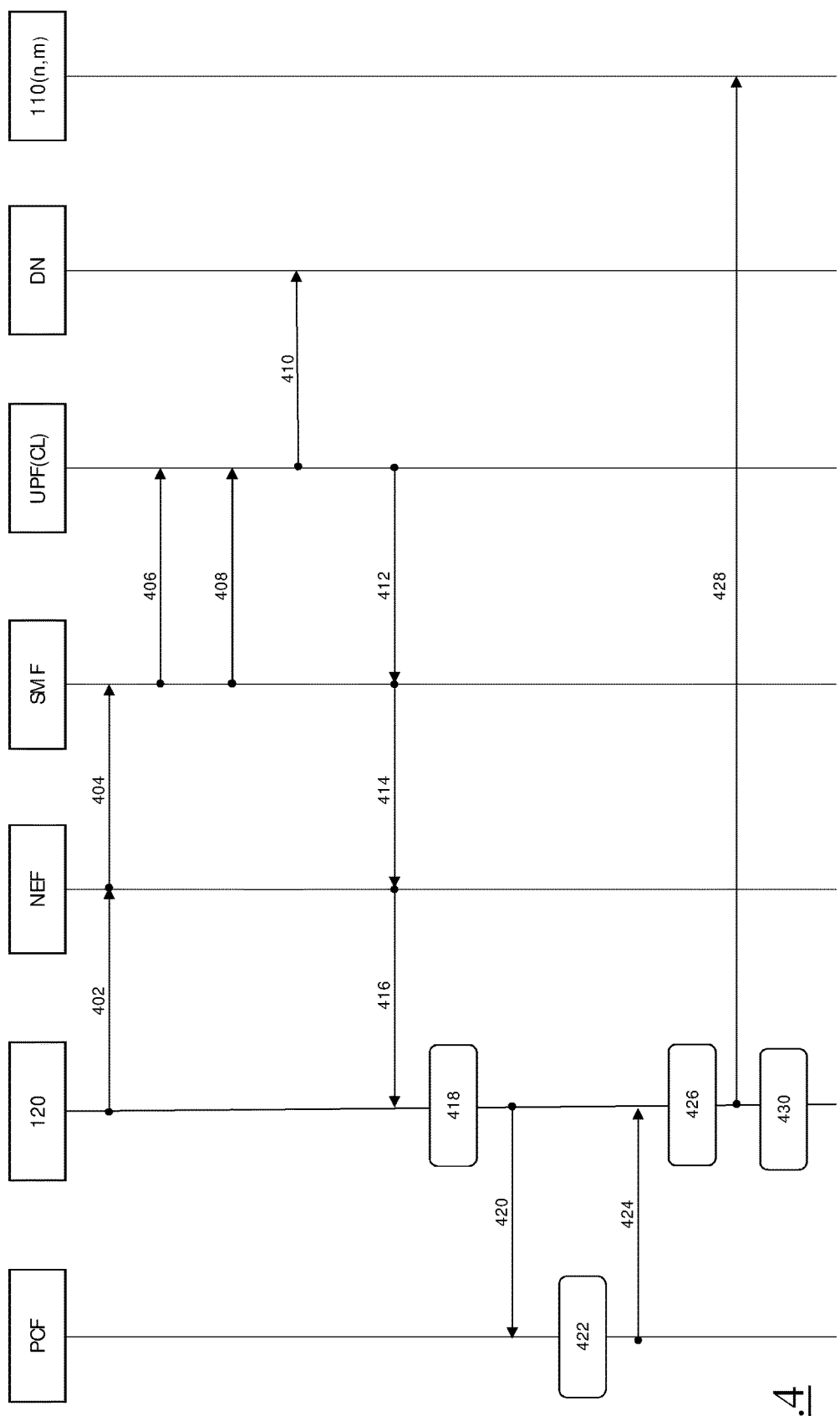
FIG. 4 schematically illustrates a set of operation phases carried out by modules of the mobile communication network, the broker platform and a UE for the management of additional data quotas taken from a selected network additional data quota according to an embodiment of the present invention.

FIG. 4 schematically illustrates a set of operation phases carried out by modules of the mobile communication network 105(n), the broker platform 120 and a UE 110(n,m) associated to the mobile communication network 105(n) for the management of additional data quotas AD(n,m) taken from selected network additional data quotas NQ(n,k) (as in the scenarios of FIGS. 1A-1C) or from the shared data quota Q(n,p) (as in the scenario of FIG. 1D) according to an embodiment of the present invention.

It is pointed out that the operation phases illustrated in FIG. 4 can be applied to any of the previously described scenarios with reference to FIGS. 1A-1D. Moreover, it has to be underlined that all the described scenarios, or at least a subset thereof, can coexist together at the same time in a more complex multiple-scenario.

Figure 5:
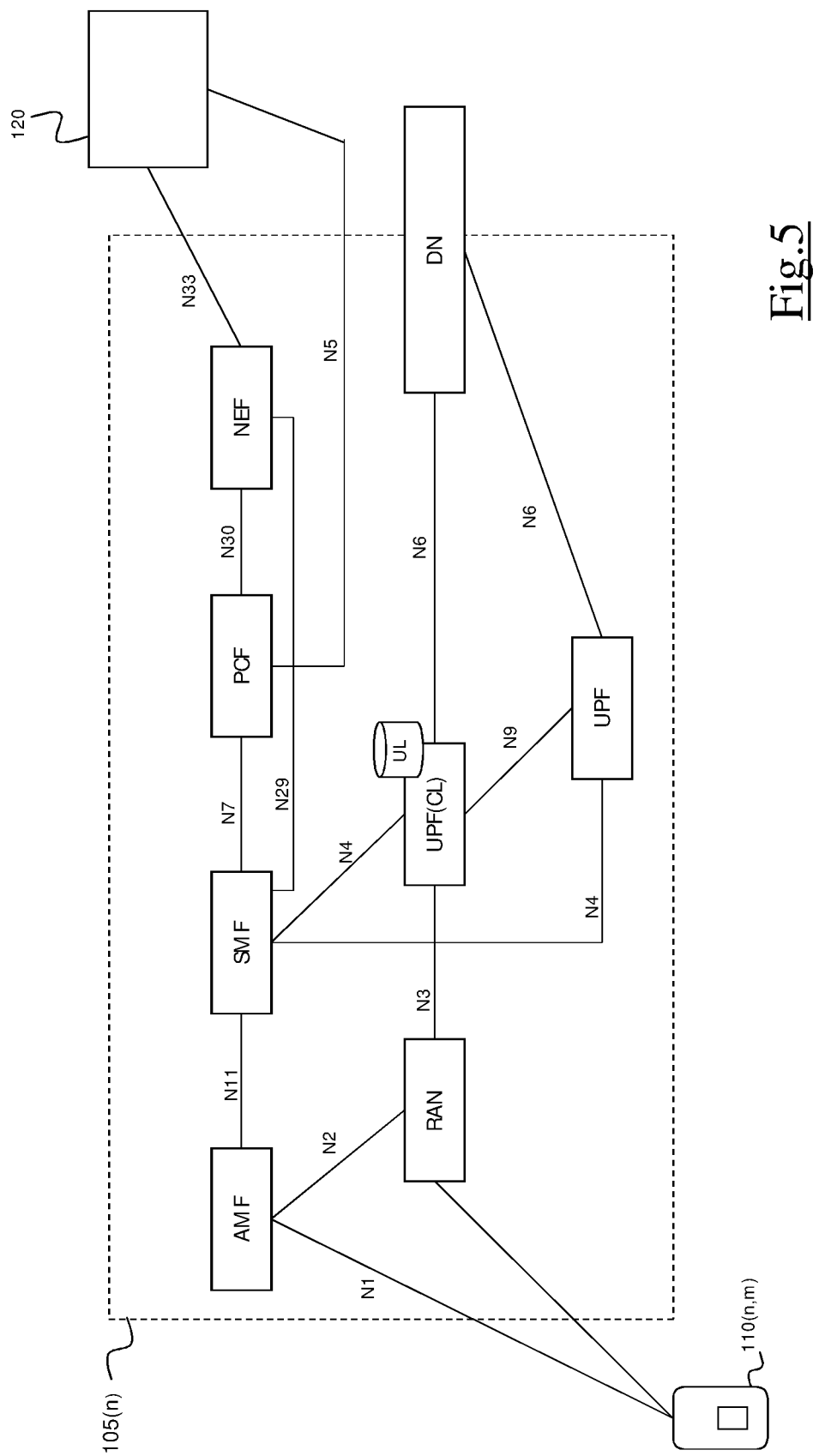
FIG. 5 is a reference point representation of some modules of the a 5G mobile communication network.

Moreover, it has to be underlined that the broker platform 120 interfaces with the modules of the mobile communication network 105(n) for identifying and discriminating data packets transmitted to and received by UE 110(n,m) which relates to additional data quota AD(n,m) taken from selected network additional data quotas NQ(n,k) (as in the scenarios of FIGS. 1A-1C) or from the shared data quota Q(n,p) (as in the scenario of FIG. 1D). For this purpose, making reference to FIG. 5, wherein a reference point representation of some modules of the 5G mobile communication network 105(n) is provided (according to 5G terminology, the modules being also referred to as "functions"), showing a Network Exposure Function NEF, a Session Management Function SMF, a Policy and Charging Function PCF, a User Plane Function UPF, an Access and Mobility Function AMF, a Radio Access Network RAN, a Data Network DN, and corresponding interfaces N1, N2, N3, N4, N5, N6, N7, N9, N11, N29, N30, N33, the broker platform 120 is represented as an Application Function (AF) interacting with the mobile communication network 105(*n*) which may be coupled to the NEF module through interfaces N33 in case the broker platform 120 is not within the domain of the (operator of) the (5G) mobile communication network 105(*n*), otherwise the broker platform 120 is directly linked to the PCF module through interface N5.

Returning back to FIG. 4 and, for the sake of simplicity, assuming that the broker platform 120 is not within the domain of the (operator of) the (5G) mobile communication network 105(*n*), based on standard specification 3GPP TS 23.502 "Procedures for the 5G System—Stage 2", 3GPP TS 23.503 "Policy and Charging control Framework for the 5G system—Stage 2", 3GPP TS 29.244 "Interface between the Control Plane and the User Plane Nodes—Stage 3", according to an embodiment of the present invention, the broker platform 120 interacts with the SMF through the NEF for opening towards a specific UPF instance (identified as UPF(CL)) a plurality of Packet Forwarding Control Protocol (PFCP) sessions, each one corresponding to a respective one of the network additional data quotas NQ(n,k) (as in the scenarios of FIGS. 1A-1C) or to a respective one of the shared data quota Q(n,p) (as in the scenario of FIG. 1D). These PFCP sessions allow communication between control plane and user plane functions through interface N4. In greater details, according to an embodiment of the present invention, the broker platform 120 sends to the NEF a request to establish a corresponding PFCP session for each network additional data quota NQ(n,k) (as in the scenarios of FIGS. 1A-1C) or for each shared data quota Q(n,p) (as in the scenario of FIG. 1D) (operation 402), which is in turn forwarded to the SMF (operation 404). For each request to establish a PFCP session for a network additional data quota NQ(n,k) (as in the scenarios of FIGS. 1A-1C) or for a shared data quota Q(n,p) (as in the scenario of FIG. 1D), the broker platform 120 communicates also the data amounts (data thresholds) th(n,m) of the corresponding additional data quotas AD(n,m) offered to the UE 110(*n,m*) requiring to exploit the network additional data quota NQ(n,k) (as in the scenarios of FIGS. 1A-1C) or the shared data quota Q(n,p) (as in the scenario of FIG. 1D).

According to an embodiment of the present invention, the SMF opens toward the UPF(CL) instance a PFCP session for a network additional data quota NQ(n,k) (as in the scenarios of FIGS. 1A-1C) or for a shared data quota Q(n,p) (as in the scenario of FIG. 1D), establishing for each UE 110(*n,m*) requiring to exploit the network additional data quota NQ(n, k) (as in the scenarios of FIGS. 1A-1C) or the shared data quota Q(n,p) (as in the scenario of FIG. 1D) a corresponding packet of rules, in the 3GPP standard referred to as Packet Detection Rules (PDR) (operation 406). The PDR comprises, among the others, a Forwarding Action Rule (FAR), a Buffering Action Rule (BAR), a QoS Enforcement Rule (QER), a Usage Reporting Rule (URR), and Packet Detection Information (PDI).

According to an embodiment of the present invention, the URR of the PDR corresponding to a specific UE 110(*n,m*) provides information about the way the additional data quota AD(n,m) taken from the network additional data quota NQ(n,k) (as in the scenarios of FIGS. 1A-1C) or from the shared data quota Q(n,p) (according to the scenario of FIG. 1D) is used, for example in terms of usage time, data bundle of interest, service topology and/or indication of specific events (e.g., notifications about the expiration of the additional data quota AD(n,m)).

According to an embodiment of the present invention, while the FAR, the BAR, the QER, and the PDI of the PDRs corresponding to a PFCP session are the same for all the UE 110(*n,m*) configured to exploit the network additional data quota NQ(n,k) (as in the scenarios of FIGS. 1A-1C) or the shared data quota Q(n,p) (as in the scenario of FIG. 1D), the URR of each PDR corresponding to a UE 110(*n,m*) provides the run-time data usage t(n,m) of the additional data quota AD(n,m) associated to the UE 110(*n,m*), i.e., the amount of data actually used by that UE 110(*n,m*) taken from the associated additional data quota AD(n,m). The URRs of the UE 110(*n,m*) configured to exploit the network additional data quota NQ(n,k) (as in the scenarios of FIGS. 1A-1C) or the shared data quota Q(n,p) (as in the scenario of FIG. 1D) are calculated based on activities carried out by the UE 110(*n,m*) when it is actually exploiting data from the network additional data quota NQ(n,k) (as in the scenarios of FIGS. 1A-1C) or from the shared data quota Q(n,p) (as in the scenario of FIG. 1D).

According to an embodiment of the present invention, once the SMF established a communication with the instance UPF(CL), the SMF instantiates the Uplink Classifier functionality within the UPF(CL) (operation 408). According to an embodiment of the present invention, the Uplink Classifier (identified in FIG. 5 with reference UL) uses appropriate filters and parameterizations (which are defined in standard specifications) for identifying and discriminating data packets transmitted to/received from UE 110(*n,m*) that uses the network additional data quota NQ(n, k) (as in the scenarios of FIGS. 1A-1C) or the shared data quota Q(n,p) (as in the scenario of FIG. 1D). The UPF(CL) allows data of UE 110(*n,m*) corresponding to the associated additional data quota AD(n,m) to be forwarded to the Data Network DN via the interface N6 (operation 410), and, therefore, to be transmitted to/received from the UE 110(*n, m*). According to an embodiment of the present invention, the Uplink Classifier UL within the UPF(CL) may also interface with a generic UPF via the interface N9, so to simultaneously allow also traditional communication, i.e., based on corresponding (mobile) data quota DQ(n,m) owned by the UE 110(*n,m*), to the Data Network DN via the N6 logical interface.

According to an embodiment of the present invention, the SMF periodically receives from UPF(CL) and forwards to the broker platform 120—through the NEF—the run-time data usages t(n,m) of additional data quotas AD(n,m) of the UE 110(*n,m*) that are using the network additional data quota NQ(n,k) (as in the scenarios of FIGS. 1A-1C) or the shared data quota Q(n,p) (as in the scenario of FIG. 1D) (operations 412, 414, 416). According to an embodiment of the present invention, the run-time data usages t(n,m) are obtained based on the URR of the UE 110(*n,m*) that are using the network additional data quota NQ(n,k) (as in the scenarios of FIGS. 1A-1C) or the shared data quota Q(n,p) (as in the scenario of FIG. 1D).

According to an embodiment of the present invention, for each UE 110(*n,m*) that is using the network additional data quota NQ(n,k) (as in the scenarios of FIGS. 1A-1C) or the shared data quota Q(n,p) (as in the scenario of FIG. 1D), the broker platform 120 is configured to compare its actual run-time data usage t(n,m) with the amount of data (data threshold) th(n,m) of the corresponding additional data quota AD(n,m) offered to the UE 110(*n,m*) (as in the scenarios of FIGS. 1A-1C) or requested by the UE 110(*n,m*) (as in the scenario of FIG. 1D) (operation 418). In this way, the broker platform 120 is able to monitor for each UE 110($n,m$) the residual availability of data of the corresponding offered/requested additional data quota AD(n,m).

According to an embodiment of the present invention (not illustrated in the figures), the broker platform 120 may be configured to implement an early notification mechanism which provides for generating a warning when the run-time data usage t(n,m) of an additional data quota AD(n,m) by the corresponding UE 110($n,m$) reached a predefined fraction of the amount of data (data threshold) th(n,m) of the additional data quota AD(n,m), such as for example the 80% or the 90% of th(n,m).

According to an embodiment of the present invention, the broker platform 120 is configured to periodically add up the run-time data usages t(n,m) of all the UE 110($n,m$) that are using a same network additional data quota NQ(n,k) (as in the scenarios of FIGS. 1A-1C) or a same shared data quota Q(n,p) (as in the scenario of FIG. 1D), in order to calculate an overall data usage T(n, k) of the network additional data quota NQ(n,k) (as in the scenarios of FIGS. 1A-1C) or the shared data quota Q(n,p) (as in the scenario of FIG. 1D), and periodically forward this overall data usage T(n,k) to the PCF (operation 420).

According to an embodiment of the present invention, for each network additional data quota NQ(n,k) (as in the scenarios of FIGS. 1A-1C) or each shared data quota Q(n,p) (as in the scenario of FIG. 1D), the PCF is configured to compare the corresponding overall data usage T(n, k) with the overall amount of data TH(n, k) corresponding to the network additional data quota NQ(n,k) (as in the scenarios of FIGS. 1A-1C) or the shared data quota Q(n,p) (as in the scenario of FIG. 1D) (operation 422).

According to an embodiment of the present invention, the PCF is configured to notify the broker platform 120 updated information about the residual availability of data of the various network additional data quotas NQ(n,k) (as in the scenarios of FIGS. 1A-1C) or the various shared data quotas Q(n,p) (as in the scenario of FIG. 1D) (operation 424).

As already mentioned above in relation to the previously described operations 412, 414 and 416, the SMF periodically forwards to the broker platform 120—through the NEF—the run-time data usages t(n,m) the additional data quotas AD(n,m) of the UE 110($n,m$) that are using the network additional data quota NQ(n,k) (as in the scenarios of FIGS. 1A-1C) or the shared data quota Q(n,p) (as in the scenario of FIG. 1D). According to an embodiment of the present invention, the broker platform 120 is configured to assess that a UE 110($n,m$) consumed all the amount of data (data threshold) th(n,m) associated to its additional data quota AD(n,m) when the run-time data usage t(n, m) of the additional data quota AD(n,m) by the corresponding UE 110($n,m$) reached the corresponding data threshold th(n,m) (operation 426). In this case, according to an embodiment of the present invention the broker platform 120 properly informs the user of the UE 110($n,m$) about the inability of benefiting anymore from the data of its additional data quota AD(n,m), such as for example by SMS, email, app-notification or other means (operation 428).

According to an embodiment of the present invention (not illustrated in FIG. 4), when this situation occurs, the broker platform 120 is configured to inform the owner of the network additional data quota NQ(n,k) (as in the scenarios of FIGS. 1A-1C) or of the shared data quota Q(n,p) (as in the scenario of FIG. 1D) corresponding to the expired additional data quota AD(n,m), about the reduction of available data in the network additional data quota NQ(n,k) (as in the scenarios of FIGS. 1A-1C) or in the shared data quota Q(n,p) (as in the scenario of FIG. 1D).

As already mentioned in relation to operation 422, for each network additional data quota NQ(n,k) (as in the scenarios of FIGS. 1A-1C) or for each shared data quota Q(n,p) (as in the scenario of FIG. 1D), the PCF is configured to compare the corresponding overall data usage T(n, k) with the overall amount of data TH(n, k) of the network additional data quota NQ(n,k) (as in the scenarios of FIGS. 1A-1C) or the shared data quota Q(n,p) (as in the scenario of FIG. 1D). According to an embodiment of the present invention, the broker platform 120 is configured to assess that the data of the network additional data quota NQ(n,k) (as in the scenarios of FIGS. 1A-1C) or of the shared data quota Q(n,p) (according to the scenario of FIG. 1D) has been entirely consumed when the corresponding overall data usage T(n, k) reached the corresponding overall amount of data TH(n, k) (block 430). In this case, the network additional data quota NQ(n,k) (as in the scenarios of FIGS. 1A-1C) or the shared data quota Q(n,p) (as in the scenario of FIG. 1D) cannot be used anymore.

According to an embodiment of the present invention (not illustrated in figure), when this situation occurs, the broker platform 120 is configured to inform the owner of the network additional data quota NQ(n,k) (as in the scenarios of FIGS. 1A-1C) or of the shared data quota Q(n,p) (as in the scenario of FIG. 1D), about the expiration of the network additional data quota NQ(n,k) (as in the scenarios of FIGS. 1A-1C) or of the shared data quota Q(n,p) (as in the scenario of FIG. 1D).

According to an embodiment of the invention (not illustrated in FIG. 4), the broker platform 120 may be configured to implement an early notification mechanism which provides for generating a warning when the overall data usage T(n,k) of a network additional data quota NQ(n,k) (as in the scenarios of FIGS. 1A-1C) or of a shared data quota Q(n,p) (as in the scenario of FIG. 1D) reached a predefined fraction of the corresponding overall amount of data TH(n,k), such as for example the 80% or the 90% of the overall amount of data TH(n,k).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in other embodiments.

The invention claimed is:

1. A system comprising:
   at least one mobile communication network adapted to grant user equipment (UE) subscribed thereto, a corresponding data quota comprising a corresponding amount of mobile data the UE is allowed to exchange with the mobile communication network it is subscribed to;
   a broker platform computing device configured to:
   make available for at least one mobile communication network a corresponding set of further data quotas;

receive a data amount request of a corresponding additional data quota for a UE subscribed to a corresponding mobile communication network;

in response to the received data amount request, select a further data quota from the set of further data quotas corresponding to the mobile communication network the UE is subscribed to;

provide the additional data quota to the UE through the mobile communication network the UE is subscribed to by exploiting at least a part of the selected further additional data quota; and in response to a received data amount request of an additional data quota for a UE subscribed to a corresponding mobile communication network, interact with a Session Management Function of the mobile communication network for opening a Packet Forwarding Control Protocol session toward a User Plane Function instance corresponding to the selected further data quota, and provide a corresponding data threshold for the additional data quota.

2. The system of claim 1, wherein the set of further data quotas comprise network additional data quotas made available on the broker platform computing device in response to a data quota agreement established between the at least one mobile communication network and at least one of:

the broker platform computing device; and a service provider.

3. The system of claim 1, wherein the set of further data quotas comprise at least one shared data quota taken from the data quota of a corresponding UE subscribed to the mobile communication network corresponding to the set of further data quotas, the at least one shared data quota being made available on the broker platform computing device in response to a data sharing agreement between the broker platform computing device and the corresponding UE.

4. The system of claim 1, wherein the Session Management Function of the mobile communication network is configured to open the Packet Forwarding Control Protocol session and establish a packet of rules comprising an indication of a run-time data usage of the additional data quota for the UE.

5. The system of claim 4, wherein the Session Management Function of the mobile communication network is further configured to instantiate an Uplink Classifier functionality within the User Plane Function instance for identifying and discriminating data packets transmitted to/received from UE using the additional data quota.

6. The system of claim 4, wherein the Session Management Function of the mobile communication network is further configured to periodically forward to the broker platform computing device the run-time data usages of additional data quotas for UE that are using the selected further data quota.

7. The system of claim 6, wherein the broker platform computing device is configured to monitor residual availability of data of an additional data quota for a UE by making a comparison between the actual run-time data usage of the UE and the data threshold for the additional data quota.

8. The system of claim 7, wherein the broker platform computing device is configured to notify a UE about the inability of benefiting anymore from the data of the corresponding additional data quota when the actual run-time data usage of the UE equals the data threshold for the additional data quota.

9. The system of claim 8, wherein the broker platform computing device is configured to generate a notification about a reduction of available data in the selected further data quota when the actual run-time data usage of the UE equals the data threshold for the additional data quota.

10. The system of claim 7, wherein the broker platform computing device is configured to add up the run-time data usages of additional data quotas for UE that are using a same further data quota for calculating an overall data usage of the further data quota, and sending the calculated overall data usage of the further data quota to a Policy and Charging Function of the mobile communication network corresponding to the further data quota.

11. The system of claim 10, wherein the broker platform computing device is configured to generate a notification about the expiration of a further data quota when the calculated overall data usage of the further data quota reaches a corresponding overall amount of data of the further data quota.

12. A method, comprising:

having at least one mobile communication network grant user equipment (UE) subscribed thereto, a corresponding data quota comprising a corresponding amount of mobile data the UE is allowed to exchange with the mobile communication network it is subscribed to; and having a broker platform computing device execute the following operations:

making available, for at least one mobile communication network, a corresponding set of further data quotas;

receiving a data amount request of a corresponding additional data quota for a UE subscribed to a corresponding mobile communication network;

in response to the received data amount request, selecting a further data quota from the set of further data quotas corresponding to the mobile communication network the UE is subscribed to; and providing the additional data quota to the UE through the mobile communication network the UE is subscribed to by exploiting at least a part of the selected further data quota; and in response to a received data amount request of an additional data quota for a UE subscribed to a corresponding mobile communication network, interact with a Session Management Function of the mobile communication network for opening a Packet Forwarding Control Protocol session toward a User Plane Function instance corresponding to the selected further data quota, and provide a corresponding data threshold for the additional data quota.

13. The method of claim 12, wherein the set of further data quotas comprise at least one shared data quota taken from the data quota of a corresponding UE subscribed to the mobile communication network corresponding to the set of further data quotas, the at least one shared data quota being made available on the broker platform computing device in response to a data sharing agreement between the broker platform computing device and the corresponding UE.

14. The method of claim 12, wherein the set of further data quotas comprise network additional data quotas made available on the broker platform computing device in response to a data quota agreement established between the at least one mobile communication network and at least one of:

the broker platform computing device; and a service provider.

15. One or more non-transitory computer readable storage media storing an application that, when executed by one or a combination of processors, performs operations comprising:

granting, by at least one mobile communication network, user equipment (UE) subscribed to the at least one mobile communication network, a corresponding data quota comprising a corresponding amount of mobile data the UE is allowed to exchange with the mobile communication network it is subscribed to; and causing a broker platform program to execute the following operations:

making available, for at least one mobile communication network, a corresponding set of further data quotas;

receiving a data amount request of a corresponding additional data quota for a UE subscribed to a corresponding mobile communication network;

in response to the received data amount request, selecting a further data quota from the set of further data quotas corresponding to the mobile communication network the UE is subscribed to;

providing the additional data quota to the UE through the mobile communication network the UE is subscribed to by exploiting at least a part of the selected further data quota; and in response to a received data amount request of an additional data quota for a UE subscribed to a corresponding mobile communication network, interact with a Session Management Function of the mobile communication network for opening a Packet Forwarding Control Protocol session toward a User Plane Function instance corresponding to the selected further data quota, and provide a corresponding data threshold for the additional data quota.

16. The one or more non-transitory computer readable storage media of claim 15, wherein the set of further data quotas comprise at least one shared data quota taken from the data quota of a corresponding UE subscribed to the mobile communication network corresponding to the set of further data quotas, the at least one shared data quota being made available by the broker platform program in response to a data sharing agreement with the corresponding UE.

* * * * *